(12) United States Patent
Van Wie

(10) Patent No.: US 12,468,380 B2
(45) Date of Patent: Nov. 11, 2025

(54) COMMUNICATING BETWEEN A VIRTUAL AREA AND A PHYSICAL SPACE

(71) Applicant: Sococo, LLC, Austin, TX (US)

(72) Inventor: David Van Wie, Eugene, OR (US)

(73) Assignee: Sococo, LLC, Austin, TX (US)

( * ) Notice: Subject to any disclaimer, the term of this patent is extended or adjusted under 35 U.S.C. 154(b) by 0 days.

(21) Appl. No.: 18/668,247

(22) Filed: May 20, 2024

(65) Prior Publication Data

US 2024/0302934 A1 Sep. 12, 2024

Related U.S. Application Data

(60) Continuation of application No. 17/092,741, filed on Nov. 9, 2020, now Pat. No. 12,014,021, which is a (Continued)

(51) Int. Cl.
| | |
|---|---|
| *H04L 12/18* | (2006.01) |
| *G06F 3/01* | (2006.01) |
| *G06F 3/04812* | (2022.01) |
| *G06F 3/04815* | (2022.01) |
| *G06F 3/0484* | (2022.01) |

(Continued)

(52) U.S. Cl.
CPC .......... *G06F 3/011* (2013.01); *G06F 3/04812* (2013.01); *G06F 3/04815* (2013.01); *G06F 3/0484* (2013.01); *G06Q 50/60* (2024.01); *H04L 12/1827* (2013.01); *H04L 65/403* (2013.01); *H04M 3/567* (2013.01); *H04N 7/157* (2013.01);
(Continued)

(58) Field of Classification Search
None
See application file for complete search history.

(56) References Cited

U.S. PATENT DOCUMENTS

| | | | | |
|---|---|---|---|---|
| 7,574,743 B2 * | 8/2009 | Masuzawa | ............. | G06F 21/57 |
| | | | | 726/22 |
| 11,283,844 B2 * | 3/2022 | Lal | ........................ | H04L 65/403 |
| (Continued) | | | | |

OTHER PUBLICATIONS

Notice of Allowance mailed Feb. 14, 2024, filed in U.S. Appl. No. 17/092,741, pp. 1-3.

(Continued)

*Primary Examiner* — Elias Mamo

(57) ABSTRACT

Apparatus transmits an identifier for association with a virtual area by an administering network service, generates output data from human perceptible stimulus in a physical space, transmits the output data in connection with the virtual area, receives input data associated with the virtual area, and generates human perceptible stimulus in the physical space from the input data. A persistent association is created between the apparatus and a virtual area. A respective presence is established in the virtual area for a communicant operating a client network node connected to the virtual area. A respective connection between each active pair of complementary sources and sinks of the client network node and the apparatus are administered in association with the virtual area. A client network node displays a graphical user interface, establishes the administered connections, and presents interaction controls associated with the object for interacting with communicants in the physical space.

11 Claims, 9 Drawing Sheets

Related U.S. Application Data division of application No. 15/853,831, filed on Dec. 24, 2017, now Pat. No. 10,838,572, which is a continuation of application No. 15/437,335, filed on Feb. 20, 2017, now Pat. No. 9,851,863, which is a continuation of application No. 14/930,472, filed on Nov. 2, 2015, now Pat. No. 9,575,625, which is a continuation of application No. 13/554,051, filed on Jul. 20, 2012, now Pat. No. 9,182,883.

(60) Provisional application No. 61/637,190, filed on Apr. 23, 2012, provisional application No. 61/510,698, filed on Jul. 22, 2011.

(51) Int. Cl.
*G06Q 50/60* (2024.01)
*H04L 65/403* (2022.01)
*H04M 3/56* (2006.01)
*H04N 7/15* (2006.01)

(52) U.S. Cl.
CPC .................. *H04M 2201/42* (2013.01); *H04M 2203/1025* (2013.01)

(56) References Cited

U.S. PATENT DOCUMENTS

| | | | | |
|---|---|---|---|---|
| 2005/0062844 | A1* | 3/2005 | Ferren | H04N 7/15 |
| | | | | 348/E7.083 |
| 2010/0005142 | A1* | 1/2010 | Xiao | H04L 67/54 |
| | | | | 709/204 |
| 2010/0302345 | A1* | 12/2010 | Baldino | G06Q 10/10 |
| | | | | 348/E7.083 |
| 2011/0004481 | A1* | 1/2011 | Jones | G06F 3/011 |
| | | | | 705/1.1 |

OTHER PUBLICATIONS

Response to Non-Final Office Action dated Nov. 13, 2023, filed in U.S. Appl. No. 17/092,741, pp. 1-10.

Non-Final Office Action mailed May 11, 2023, filed in U.S. Appl. No. 17/092,741, pp. 1-10.

Request for Continued Examination dated Apr. 4, 2023, filed in U.S. Appl. No. 17/092,741, pp. 1-9.

Final Office Action mailed Oct. 6, 2022, filed in U.S. Appl. No. 17/092,741, pp. 1-6.

Response to Non-Final Office Action dated Aug. 3, 2022, filed in U.S. Appl. No. 17/092,741, pp. 1-6.

Non-Final Office Action mailed Mar. 2, 2022, filed in U.S. Appl. No. 17/092,741, pp. 1-9.

\* cited by examiner

COMMUNICATING BETWEEN A VIRTUAL AREA AND A PHYSICAL SPACE

CROSS-REFERENCE TO RELATED APPLICATIONS

Under 35 U.S.C. § 119(e), this application claims the benefit of U.S. Provisional Application No. 61/510,698, filed Jul. 22, 2011, and U.S. Provisional Application No. 61/637,190, filed Apr. 23, 2012, the entirety of each of which is incorporated herein by reference the entirety of which is incorporated herein by reference.

This application also relates to the following co-pending patent applications, the entirety of each of which is incorporated herein by reference: U.S. patent application Ser. No. 13/409,344, filed Mar. 1, 2012; U.S. application Ser. No. 13/229,349, filed Sep. 9, 2011; U.S. application Ser. No. 13/229,395, filed Sep. 9, 2011; U.S. application Ser. No. 13/209,812, filed Aug. 15, 2011; U.S. application Ser. No. 12/825,512, filed Jun. 29, 2010; U.S. application Ser. No. 12/694,126, filed Jan. 26, 2010; U.S. application Ser. No. 12/509,658, filed Jul. 27, 2009; U.S. application Ser. No. 12/418,243, filed Apr. 3, 2009; U.S. application Ser. No. 12/418,270, filed Apr. 3, 2009; U.S. application Ser. No. 12/354,709, filed Jan. 15, 2009; U.S. application Ser. No. 12/630,973, filed on Dec. 4, 2009; U.S. application Ser. No. 12/818,517, filed Jun. 18, 2010; U.S. patent application Ser. No. 12/855,210, filed Aug. 12, 2010; U.S. Provisional Patent Application No. 61/563,088, filed Nov. 23, 2011; and U.S. Provisional Patent Application No. 61/535,910, filed Sep. 16, 2011.

BACKGROUND

When face-to-face communications are not practical, people often rely on one or more technological solutions to meet their communications needs. These solutions typically are designed to simulate one or more aspects of face-to-face communications. Traditional telephony systems enable voice communications between callers. Instant messaging (also referred to as "chat") communications systems enable users to communicate text messages in real time through instant message computer clients. Some instant messaging systems additionally allow users to be represented in a virtual environment by user-controllable graphical objects (referred to as "avatars"). Interactive virtual reality communication systems enable users in remote locations to communicate and interact with each other by manipulating their respective avatars in virtual spaces.

DETAILED DESCRIPTION

Figure 1:
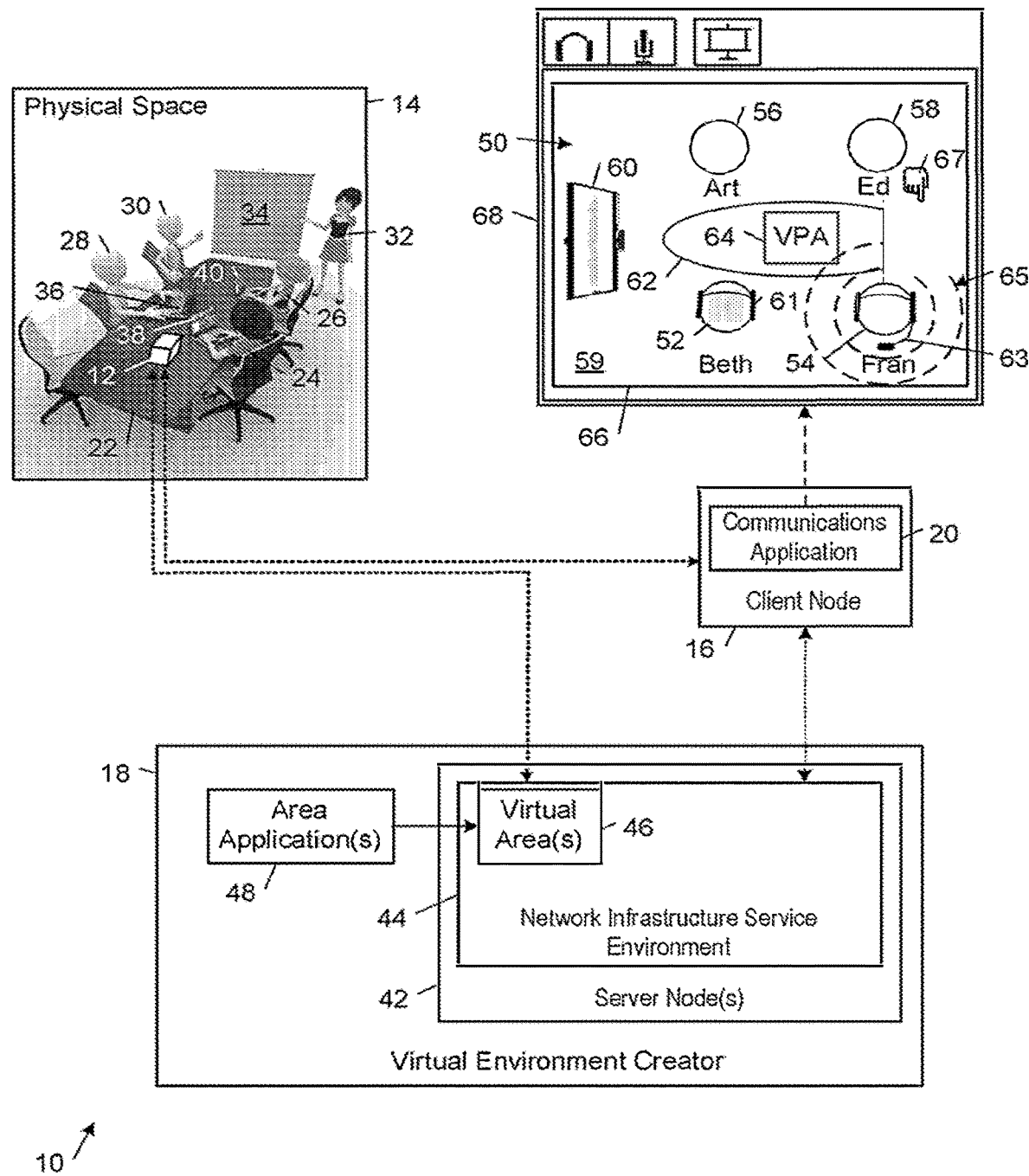
FIG. 1 is a block diagram of an example of a network communications environment that includes virtual presence apparatus in a physical space, a remote client network node, and a virtual environment creator.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" (also referred to as "memory") refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

Synchronous conferencing refers to communications in which communicants participate at the same time. Synchronous conferencing encompasses all types of networked collaboration technologies, including instant messaging (e.g., text chat), audio conferencing, video conferencing, application sharing, and file sharing technologies.

A "communicant interaction" is any type of direct or indirect action or influence between a communicant and another network entity, which may include for example another communicant, a virtual area, or a network service. Examples of types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "physical space" is a three-dimensional real-world environment in which a communicant can be located physically.

A "virtual area" (also referred to as an "area" or a "place") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "persistent virtual area" is a virtual area that persists even after all communicants have disconnected from the virtual area. The state of a persistent virtual area is preserved so that it can be restored the next time a communicant connects to the virtual area. A "persistent association" between a virtual area and virtual presence apparatus is an association that persists even after all communicants and the virtual presence apparatus have disconnected from the virtual area.

A "virtual area application" (also referred to as a "virtual area specification") is a description of a virtual area that is used in creating a virtual environment. A virtual area application typically includes definitions of geometry, physics, and realtime switching rules that are associated with one or more zones of the virtual area.

A "virtual area enabled communications application" is a client communications application that integrates realtime communications (e.g., synchronous conferencing functionalities, such as audio, video, chat, and realtime other data communications) with a virtual area.

A "virtual environment" is a representation of a computer-managed space that includes at least one virtual area and supports realtime communications between communicants.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

VOIP (Voice over Internet Protocol) refers to systems and methods of delivering voice and other communications over Internet Protocol (IP) networks.

As used herein, the term "includes" means includes but not limited to, the term "including" means including but not limited to. The term "based on" means based at least in part on.

II. COMMUNICATING BETWEEN A VIRTUAL AREA AND A PHYSICAL SPACE

Examples that are described herein provide systems and methods of communicating between a virtual area and a physical space. These examples bridge the virtual area into the physical space and bridge the physical space into the virtual area through virtual presence apparatus (VPA) located in the physical space. Examples of the virtual presence apparatus transduce human perceptible stimulus (e.g., audio, visual, mechanical, and other sensory stimulus) between the virtual area and the physical space such that communicant interactions in the virtual area are seamlessly integrated into the physical space and vice versa.

FIG. 1 shows an embodiment of an exemplary network communications environment 10 that includes a virtual presence apparatus 12 in a physical space 14, a remote client network node 16, and a virtual environment creator 18 that are interconnected by a network (not shown) that supports the transmission of a wide variety of different media types (e.g., text, voice, audio, video, and other data) between network nodes. The network connections between network nodes may be arranged in a variety of different stream handling topologies, including a peer-to-peer architecture, a server-mediated architecture, and hybrid architectures that combine aspects of peer-to-peer and server-mediated architectures. Exemplary topologies of these types are described in U.S. Pat. Nos. 7,769,806 and 7,844,724.

The client network node 16 includes input/output (I/O) hardware, a processor, and a computer-readable memory that stores an instance 20 of at least one virtual area enabled communications application that is executable by the processor. The communications application 20 typically provides graphical interface and communications functions for communicating with the virtual presence apparatus 12, the virtual environment creator 18, and other client network nodes in connection with one or more virtual areas. Examples of the communications applications are described in U.S. application Ser. No. 12/418,243, filed Apr. 3, 2009, U.S. application Ser. No. 12/630,973, filed Dec. 4, 2009, U.S. application Ser. No. 12/354,709, filed Jan. 15, 2009, U.S. application Ser. No. 12/509,658, filed Jul. 27, 2009, U.S. application Ser. No. 13/209,812, filed Aug. 15, 2011, and U.S. application Ser. No. 13/229,349, filed Sep. 9, 2011. The client network node 16 has a respective set of one or more sources and a respective set of one or more sinks. Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display). The client network node 16 also typically includes administrative policies, user preferences (including preferences regarding the exportation of the user's presence and the connection of the user to the virtual environment creator 18 and other communicants), and other settings that define a local configuration that influences the administration of realtime connections with the virtual presence apparatus 12, the virtual environment creator 18, and other network nodes.

The virtual presence apparatus 12 is located in the physical space 14. In the illustrated example, the virtual presence apparatus 12 is positioned on a table 22 in a real-world conference room containing five communicants 24, 26, 28, 30, 32. The four communicants 24-30 are seated around the table 22, and the fifth communicant 32 is standing beside a real-world view screen 34. Three of the seated communicants 24-28 are operating respective virtual area enabled communications applications on their client network nodes 36, 38, 40 (e.g., mobile computers, such as laptop computers, tablet computers, and mobile phones) through which they are connected to the remote client network node 16; these three communicants 24-28 and the other two communicants 30, 32 are connected to the remote client network node 16 through the virtual presence apparatus 12.

The virtual presence apparatus 12 typically includes software and hardware resources that enable the virtual presence apparatus 12 to connect to the virtual environment creator 18 and the remote client network node 16, either directly (e.g., peer-to-peer) or through a hosted network connection. In some examples, the virtual presence apparatus 12 or a network node hosting the virtual presence apparatus includes a complete or modified version of the communications application 20, which provides functions for communicating with the virtual environment creator 18 and establishing network connections and communicating real-time data streams with the client network nodes. When connected to the virtual environment creator 18, the virtual presence apparatus 12 can be registered in association with and/or logged into the one or more virtual areas. When logged into a virtual area, the virtual presence apparatus 12 transduces human perceptible stimulus (e.g., audio, visual, mechanical, and other sensory stimulus) between the client network nodes of communicants who are present in the virtual area and the physical space 14. In this way, the virtual presence apparatus 12 bridges a physical experience of the physical space 14 to communicants in the one or more virtual areas (i.e., communicants who are present in the virtual areas) and bridges communicant interactions in the one or more virtual areas to communicants in the physical space 14.

In the illustrated example, the virtual environment creator 18 includes at least one server network node 42 that provides a network infrastructure service environment 44 that manages sessions of the remote client network node 16 and the virtual presence apparatus 12 in one or more virtual areas 46 in accordance with respective virtual area applications 48. Each of the virtual area applications 48 is hosted by a respective one of the virtual areas 46 and includes a description of the respective virtual area 46. Communicants operating respective client network nodes connect to the virtual area applications 48 through virtual area enabled communications applications.

A virtual area typically includes one or more zones. A zone may be a rendered spatial extent, a set of rules applied to a spatial extent, or both. Zones may be arranged hierarchically in a virtual area, with an outermost zone (referred to herein as the "Global Governance Zone") enclosing all other zones in the virtual area. Within the Global Governance Zone, there can be location zones (e.g., rooms of a virtual area) or smaller governance zones that enclose a group of location zones and provide regions of governance on the map. A zone definition typically also includes one or more channel definitions that describe how to create respective channels in the zone and specify the information about the channel that is published to a client network node that becomes present in the zone. A channel is always uniquely defined point-to-point and is unique to a virtual area application and a session between a client network node and the virtual area platform.

Examples of the types of rules that may be associated with a zone include switching rules, governance rules, and permission rules.

Switching rules govern realtime stream connections between network nodes that are linked to the virtual area (e.g., network nodes that are associated with objects, such as avatars, in the virtual area). The switching rules typically include a description of conditions for connecting sources and sinks of realtime data streams in terms of positions in the virtual area. Each switching rule typically includes attributes that define the realtime data stream type to which the rule applies and the location or locations in the virtual area where the rule applies. In some examples, each of the rules optionally may include one or more attributes that specify a required role of the source, a required role of the sink, a priority level of the stream, and a requested data routing topology. In some examples, if there are no explicit switching rules defined for a particular part of the virtual area, one or more implicit or default switching rules may apply to that part of the virtual area.

Governance rules control who has access to resources (e.g., the virtual area itself, regions with the virtual area, and objects within the virtual area), who has access to data (e.g., data streams and other content) that is associated with the virtual area, what is the scope of that access to the data associated the virtual area (e.g., what can a user do with the data), and what are the follow-on consequences of accessing that data (e.g., record keeping, such as audit logs, and payment requirements). In some examples, an entire virtual area or a zone of the virtual area is associated with a "governance mesh" that enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

A permission rule defines a respective capability requirement (e.g., for a respective action, behavior, or state) in terms of one or more capabilities, attributes, and settings, which may be persistent or transient. Examples of capabilities systems for administering permission rules are described in U.S. Provisional Patent Application No. 61/535,910, filed Sep. 16, 2011.

In some examples, a virtual area is defined by a specification that includes a description of geometric elements of the virtual area and one or more rules, including switching rules and governance rules. Examples of virtual area specifications are described in U.S. application Ser. No. 12/418,243, filed Apr. 3, 2009, U.S. application Ser. No. 12/818,517, filed Jun. 18, 2010, U.S. patent application Ser. No. 12/855,210, filed Aug. 12, 2010, and U.S. Provisional Application No. 61/563,088, filed Nov. 23, 2011.

The network infrastructure service environment 44 typically includes one or more network infrastructure services that cooperate with the virtual area enabled communications application 20 to establish and administer network connections between the virtual presence apparatus 12, the remote client network node 16, and other network nodes. Among the network infrastructure services that are included in an exemplary embodiment of the network infrastructure service environment 44 are an account service, a security service, an area service, a rendezvous service, and an interaction service. The structure, operation, and components of such an embodiment of the network infrastructure service environment 44 are described in U.S. patent application Ser. No. 12/825,512, filed Jun. 29, 2010.

The virtual area enabled communications applications 20, the area applications 48, and the network infrastructure service environment 44 together provide a platform (referred to herein as "the platform") that administers the realtime connections with network nodes in a virtual area subject to a set of constraints that control access to the virtual area instance.

The platform tracks communicants' realtime availabilities and activities across the different communication contexts that are defined by the area applications 48. This information is presented by the virtual area enabled communications applications to the communicants in the form of realtime visualizations that enable the communicants to make more informed network interaction decisions (e.g., when to interact with a contact) and encourages the communicants to initiate interactions with other communicants and to join contexts (e.g., an ongoing conversation between communicants) of which the communicants otherwise would not have been aware. In some embodiments, the realtime visualization includes visual cues as to the presence and activities of the communicants in the contexts of the area applications 48. The presentation of these visual cues typically depends on one or more of governance rules associated with the virtual areas 46, administrative policies, and user preferences (including preferences regarding the exportation of the user's presence and the connection of the user to areas and other communicants), which may define tiered relationship based predicates that control access to presence information and/or network resources on a zone-by-zone basis.

In some embodiments, the server network node 42 remotely manages client communication sessions with each other and with the virtual presence apparatus 12, and remotely configures audio and graphic rendering engines on the client network nodes, as well as switching of data streams by sending instructions (also referred to as definitions) from the remotely hosted area applications 48 to the client network nodes in accordance with the stream transport protocol described in U.S. application Ser. No. 12/825,512, filed Jun. 29, 2010. Data is shared between the client network node 16 and other network nodes as definition records over transport protocol sockets. The client communications application 16 receives configuration instructions from the server node 42 through definition records that are received over a server session between the client network node 16 and the server network node 42. In some of these examples, the server network node 42 sends to each of the client network nodes provisioning messages that configure the client network nodes to interconnect respective data streams between active ones of their complementary sources and sinks over respective peer-to-peer (P2P) sessions in accordance with switching rules specified in the area applications 48 and the locations where the communicants and the virtual presence apparatus are present in the virtual area 46. The client network node 16 sends content to and receives content from other network nodes through definition records that are transmitted on content-specific channels on respective sessions with the other network nodes. Data is shared in accordance with a publish/subscribe model. A stream transport service on the client network node 16 subscribes only to the data that are needed by the client network node. To subscribe, the stream transport service negotiates a channel on a session that is established with another network node. The channel is negotiated by well-known GUID for the particular area application 48. Definition records are transmitted only when a subscriber exists on the other end of a transport protocol socket. Definition records that are received by the stream transport service are delivered to the subscribing ones of the client communications application processes on arrival. In this way, the server network node 42 connects the virtual presence apparatus 12 to the virtual area 46 so that the virtual presence apparatus 12 can bridge a physical experience of the physical space 14 to communicants in the virtual area 46 and bridge a physical experience of communicant interactions in the virtual area 46 to communicants in the physical space 14.

In the illustrated embodiment, the communications application 20 operating on the remote client network node 16 presents a respective spatial visualization 50 of the virtual area 46 in accordance with data received from the network infrastructure service environment 44. The communications application 20 also provides a graphical interface for receiving user commands and providing a spatial interface that enhances the realtime communications between the communicants. The spatial visualization 50 includes respective graphical representations 52, 54, 56, 58 (referred to herein as "avatars" or "sprites") of the communicants who are present in the virtual area 46 in spatial relation to a graphical representation 59 of the virtual area 46. In the illustrated example, the sprites 52, 54, 56 represent the three communicants 24, 26, 28 (Beth, Fran, Art) who are seated in the physical space 14 and are operating the local client network nodes 36, 38, 40, and the sprite 58 represents the communicant (Ed) who is operating the remote client network node 16. The spatial visualization 50 may include other objects (also referred to as "props"). Examples of such objects include a view screen object 60 for interfacing with application sharing functions of the communications application 20 (as described in, e.g., U.S. application Ser. No. 12/418, 270, filed Apr. 3, 2009), a table object 62 for interfacing with file sharing functions of the communications application 20, and a VPA object 64 for interfacing with the virtual presence apparatus 12 in the physical space 14. The spatial visualization 50 typically is presented in a respective window 66 that is generated by the communications application 20 on a "desktop" or other system-defined base window on the display hardware 68 of the remote client network node 16.

The activities of the communicants in the virtual area 46 may be inferred from the activities on the various communication channels over which the respective client network nodes are configured to communicate. The activities on the communication channels are represented in the graphical interface by visual cues that are depicted in association with the graphical representations 52-58 of the communicants. For example, the "on" or "off" state of a communicant's local speaker channel is depicted by the presence or absence of a headphones graphic 61 on the communicant's sprite. When the speakers of the communicant who is represented by the sprite are on, the headphones graphic 61 is present (see sprites Beth and Fran) and, when the communicant's speakers are off, the headphones graphic 61 is absent. The "on" or "off" state of the communicant's microphone is depicted by the presence or absence of a microphone graphic 63 on the communicant's sprite. When the microphone is on, the microphone graphic 63 is present (see sprite Fran); and, when the microphone is off, the microphone graphic 63 is absent. The headphones graphic 61 and the microphone graphic 63 provide visual cues of the activity states of the communicant's sound playback and microphone devices. The "on" or "off" state of the communicant's microphone is depicted by the presence or absence of a microphone graphic on the communicant's graphic representation and a series of concentric circles 65 that dynamically radiate away from the communicant's graphic representation in a series of expanding waves. When the microphone is on, the microphone graphic 63 and the radiating concentric circles 65 are present and, when the microphone is off, the microphone graphic 63 and the radiating concentric circles 65 are absent. In addition to or alternatively, the current activity on a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar.

The activity on a communicant's text chat channel is depicted by the presence or absence of the hand graphic 67 adjacent the communicant's sprite (see sprite Ed). Thus, when a communicant is transmitting text chat data to another network node the hand graphic 67 is present, and when a communicant is not transmitting text chat data the hand graphic 67 is not present. In some embodiments, text chat data is transmitted only when keyboard keys are depressed, in which case the visualization of the communicant's text channel appears as a flashing on and off of the hand graphic 67.

The view screen prop 60 is associated with application sharing functionality of the platform that enables communicants to share applications operating their respective client network nodes. The application sharing functionality is invoked by activating a view screen (e.g., by single-clicking the view screen object with an input device). In some embodiments, the platform provides visual cues that indicate whether or not a communicant is sharing an application over an application sharing channel. In response to a communicant's selection of the view screen prop, the communicant's sprite automatically is moved to a position in the graphical representation of the virtual area that is adjacent the view screen prop. The position of a communicant's sprite adjacent the view screen prop indicates that the communicant currently is sharing or is about to share an application with the other communicants in the virtual area. Other communicants in the virtual subscribe to the shared application data by selecting the view screen prop in their respective views of the spatial visualization 50. The avatar of each communicant who is viewing a shared application is depicted with a pair of "eyes" to indicate that the represented communicants are viewing the content being shared in connection with the view screen props. The graphical depiction of view screen prop is changed depending on whether or not an active application sharing session is occurring. For example, the depicted color of the view screen may change from a brighter color during an active application sharing session to a darker color when there is no application sharing taking place. Examples of the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

Figure 2:
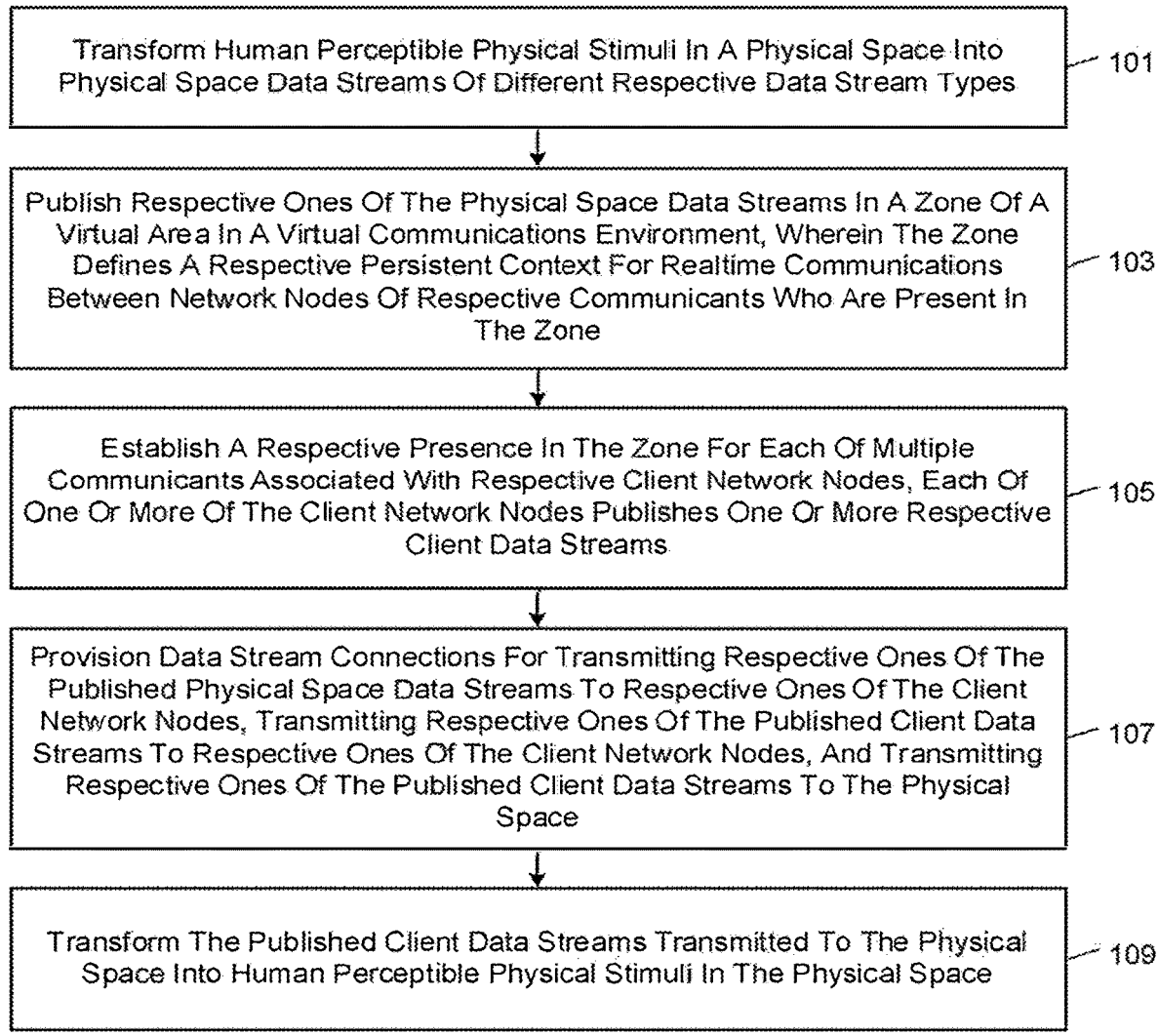
FIG. 2 shows a flow diagram of a method of communicating between a virtual area and a physical space.

FIG. 2 shows an example of a method by which the virtual environment creator 18 and the virtual presence apparatus 12 bridge the virtual area into the physical space and bridge the physical space into the virtual area. In accordance with this method, the virtual presence apparatus 12 transforms human perceptible physical stimuli in a physical space into physical space data streams of different respective data stream types (FIG. 2, block 101). The server network node 42 publishes respective ones of the physical space data streams in a zone of a virtual area in a virtual communications environment (FIG. 2, block 103). The zone defines a respective persistent context for realtime communications between network nodes of respective communicants who are present in the zone. The server network node 42 establishes a respective presence in the zone for each of multiple communicants associated with respective client network nodes. Each of one or more of the client network nodes publishes one or more respective client data streams (FIG. 2, block 105). The server network node 42 provisions data stream connections for transmitting respective ones of the published physical space data streams to respective ones of the client network nodes, transmitting respective ones of the published client data streams to respective ones of the client network nodes, and transmitting respective ones of the published client data streams to the physical space (FIG. 2, block 107). The virtual presence apparatus 12 transforms the published client data streams transmitted to the physical space into human perceptible physical stimuli in the physical space (FIG. 5, block 109).

Figure 3:
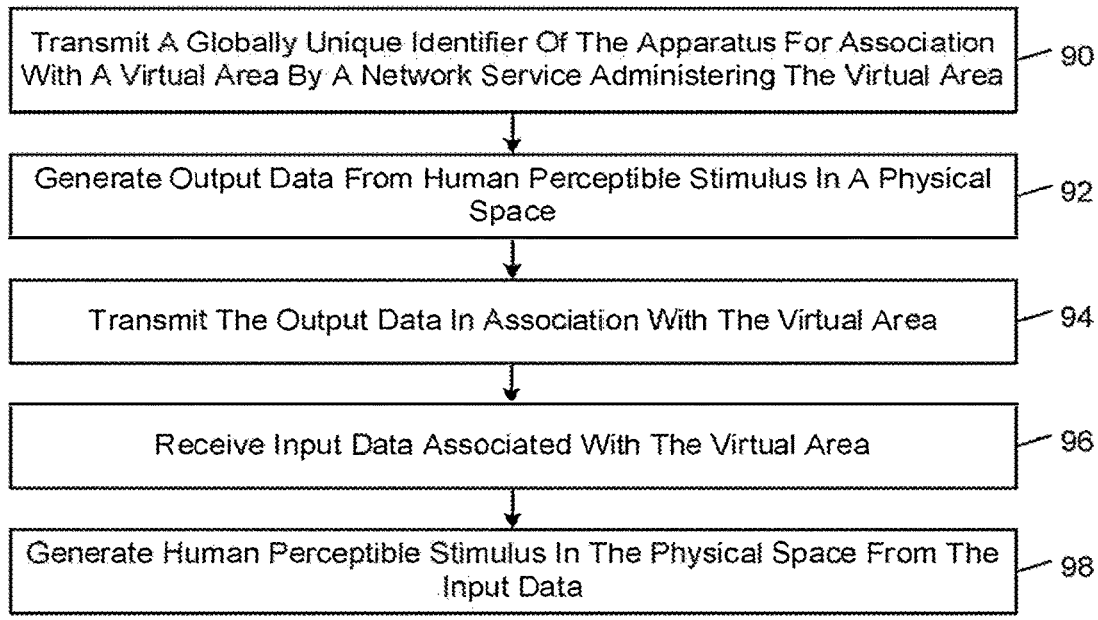
FIG. 3 is a flow diagram of an example of a method performed by an example of virtual presence apparatus.

FIG. 3 shows an example of a process that is implemented by an example of the virtual presence apparatus 12. In accordance with this method, the virtual presence apparatus 12 transmits a globally unique identifier of the virtual presence apparatus 12 for association with a virtual area by a network service administering the virtual area (FIG. 3, block 90). The virtual presence apparatus 12 generates output data from human perceptible stimulus in a physical space (FIG. 3, block 92), and transmits the output data in connection with the virtual area (FIG. 3, block 94). The virtual presence apparatus 12 receives input data associated with the virtual area (FIG. 3, block 96), and generates human perceptible stimulus in the physical space from the input data (FIG. 3, block 98).

Figure 4:
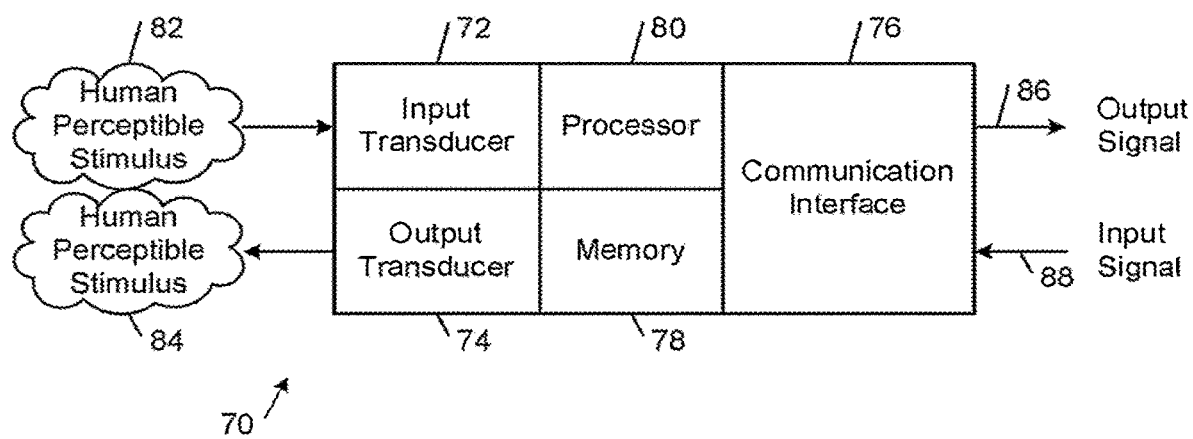
FIG. 4 is a block diagram of an example of virtual presence apparatus.

FIG. 4 shows an example 70 of the virtual presence apparatus 12 that includes an input transducer 72, an output transducer 74, a communication interface 76, a computer-readable memory 78 that stores a globally unique identifier of the virtual presence apparatus 70, and a processor 80. The communication interface 76 transmits an output signal 86 and receives an input signal 88.

The virtual presence apparatus 70 may be implemented in a variety of different ways. In some examples, the virtual presence apparatus 70 is composed of multiple components (e.g., two or more of a speaker, a microphone, a light projector, and a camera) that are integrated into a unitary device. In other examples, the virtual presence apparatus 70 is composed of a central hub (e.g., a virtual area enabled network switch or router) that controls and configures one or more separate and distinct peripheral components (e.g., a speakerphone, a digital projector, a camera, and a remote-controlled laser pointer) that are connected to respective ports (e.g., Universal Serial Bus (USB) ports) of the hub. Examples of the virtual presence apparatus 70 may have different industrial designs. In some examples, the virtual presence apparatus 70 has the form factor of a desktop appliance (e.g., a form factor similar to that of a computer, speakerphone, a digital projector, or a network hub), whereas other examples of the virtual presence apparatus 70 have robotic form factors (e.g., a remote-controlled electromechanical machine, which may or may not have a humanoid appearance).

The input transducer 72 generates output data from human perceptible stimulus 82 in the physical space 14. The input transducer 72 typically generates the output data from human perceptible stimulus that is broadcasted into the physical space. Depending on the desired communication application, the input transducer 72 may generate output data from one or more human perceptible stimuli, including for example audio, visual, mechanical, and other sensory stimuli. In some examples, the input transducer 72 includes one or more of an acoustic-to-electric transducer (e.g., a microphone, which may be a component of a telephony device, such as a mobile phone or a VoIP phone, or a headset), a light-to-electric transducer (e.g., a camera, such as a still image camera, a video camera, and a scanner that scans physical documents into scanned images), an electric-to-electric transducer (e.g., a touchscreen or other touch-sensitive sensor equipped with resistive, capacitive, surface acoustic wave, optical, or other touch-sensitive technologies), a mechanical-to-electric transducer (e.g., a tactile or other pressure- or force-sensitive transducer, a texture-sensitive transducer), and a chemical-to-electric transducer (e.g., a olfactory sensor that is capable of detecting one or more odorants).

The output transducer 74 generates human perceptible stimulus 84 in the physical space 14. The output transducer 74 typically broadcasts the human perceptible stimulus into the physical space. Depending on the desired communications application, the output transducer 74 may generate one or more human perceptible stimuli from input data, including for example audio, visual, mechanical, and other sensory stimuli. In some examples, the output transducer 74 includes one or more of an electric-to-acoustic transducer (e.g., a speaker, which may be a component of a telephony device, such as a mobile phone or a VoIP phone, or a headset), an electric-to-light transducer (e.g., an image projector such as a digital projector, a touchscreen display, a light beam projector such as a laser pointer, or a three-dimensional hologram generator), an electric-to-mechanical transducer (e.g., a haptic transducer, an electric motor that moves mechanical components, such as light sources and robot tools, and other components in the physical space, and a printer that outputs printed documents or three-dimensional objects), and an electric-to-chemical transducer (e.g., an electric odorant delivery system).

The virtual presence apparatus 70 bridges communicant activity in the physical space 14 into the virtual area 46 and bridges communicant activity in the virtual area into the physical space 14. In this process, the virtual presence apparatus 70 typically encodes output data generated by the input transducer 72 from communicant activity in the physical space 14 into the output signal 86 that is sent to the remote network node 16 connected to the virtual area, and decodes the input signal 88, which is received from the remote network node 16 and relates to communicant activity in the virtual area, into input data that is sent to the output transducer 74.

The virtual presence apparatus 12 typically is registered with the server network node 42 before the virtual presence apparatus 12 can be logged into a server session with the server network node 42. In some examples, the virtual presence apparatus 12 includes hardware and software resources that enable it to register directly with the server network node 42.

Figure 5A:
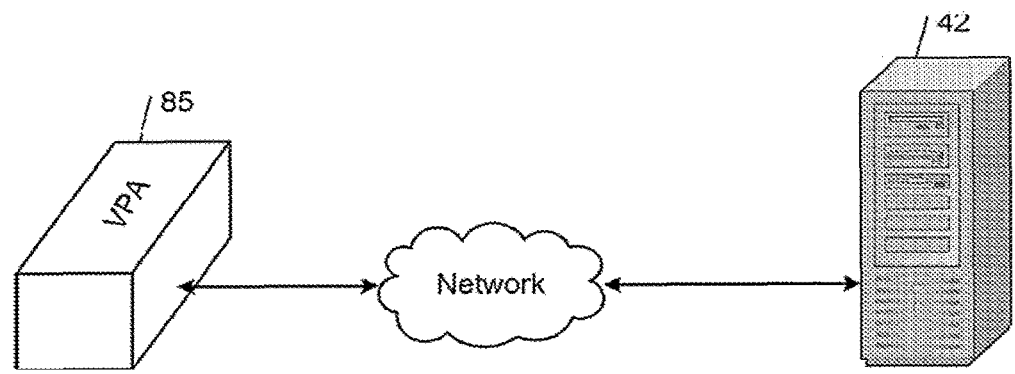
FIG. 5A is a block diagram of an example of virtual presence apparatus connected to a server network node.

For example, FIG. 5A shows an example of a network connection between the server network node 42 and an example 85 of the virtual presence apparatus 12 that can register directly with the server network node 42.

Figure 5B:
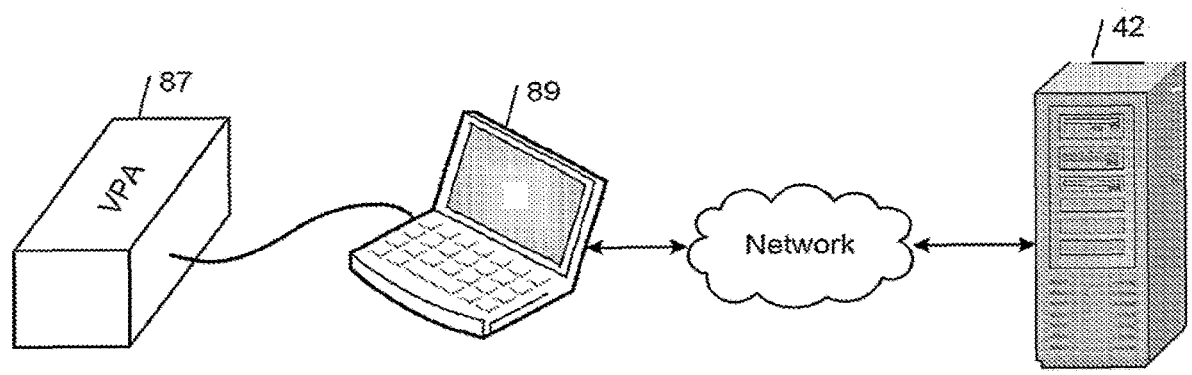
FIG. 5B is a block diagram of an example of virtual presence apparatus connected to a server network node.

In other examples, a host computer (e.g., one of the client network nodes 36-40 in the physical space) registers the virtual presence apparatus 12 with the server network node 42. FIG. 5B shows an example of a network connection between the server network node 42 and an example 87 of the virtual presence apparatus 12 that is hosted by a client network node 89 in the physical space 14. In this example, the client network node 89 submits to the server network node 42 registration information and login requests on behalf of both the virtual presence apparatus 87 and the communicant who uses the client network node 89 to access the virtual area 46.

Figure 5C:
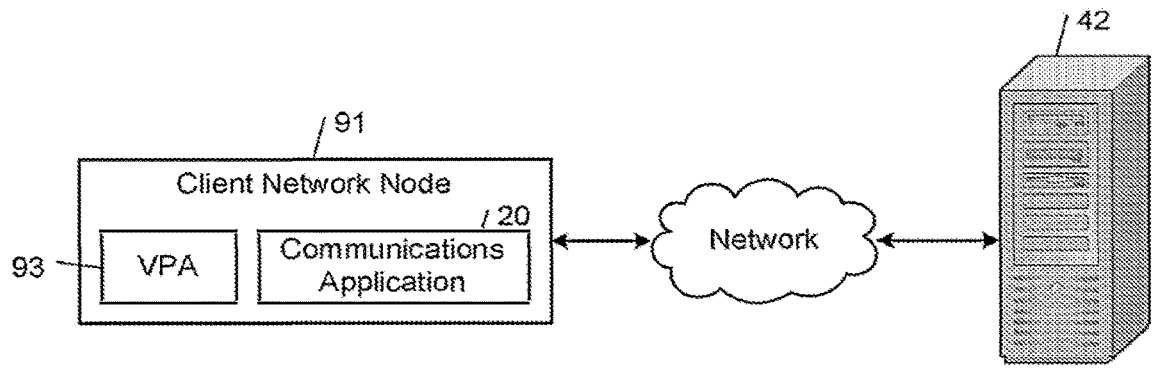
FIG. 5C is a block diagram of an example of virtual presence apparatus connected to a server network node.

FIG. 5C shows an example of a network connection between the server network node 42 and an example of 93 of the virtual presence apparatus 12 that includes one or more integral components of a client network node 91 in the physical space 14. The virtual presence apparatus 93 typically includes one or more hardware and software resources of the client network node 91. In some examples, the virtual presence apparatus 93 includes software that resides in the memory of the client network node 91 and is executed by the processor of the client network node 91 to leverage hardware resources of the client network node 91 in the process of integrating communicant interactions in the virtual area into the physical space. In some of these examples, hardware resources of the client network node 91 are partitioned (e.g., by a hypervisor or virtual machine monitor that reserves a respective set of client system resources for each partition or virtual machine) into a set of hardware resources that are used by the virtual area enabled communications application 20 and a separate set of hardware resources that constitute elements of the virtual presence apparatus 93. For example, a peripheral headset may be reserved for use by the virtual area enabled communications application 20, whereas separate microphone and speaker hardware may be reserved for use by the virtual presence apparatus 93. In some examples, certain hardware resources of the client network node 91 (e.g., a camera, a hard drive memory, or an optical disk drive) that are allocated to the virtual presence apparatus 93 are associated with respective objects in the virtual area 46, allowing those resources to be shared by other communicants in the virtual area 46.

During registration, the virtual presence apparatus 12 transmits (either directly, or indirectly through a network node hosting the virtual presence apparatus 12) registration data through its communication interface to the server network node 42. The registration data typically includes the globally unique identifier of the virtual presence apparatus 12 and configuration data. The configuration data may include, for example, a device type identifier, an indication whether the virtual presence apparatus 12 should be associated with an existing virtual area or a new virtual area, one or more conditions on the availability of the associated virtual area (e.g., the associated virtual area is accessible to communicants conditioned on the virtual area apparatus 12 being present in or logged into the virtual area), a specification of the source and sink capabilities of the virtual presence apparatus 12, and a specification of a graphical representation of the virtual presence apparatus 12. Based on the registration data, the server network node 42 generates one or more database records that store the registration information, including the identifier of the virtual presence apparatus 12 and an identifier of the new or existing virtual area. The one or more database records create a persistent association between the virtual presence apparatus 12 and the virtual area. The virtual presence apparatus identifier typically is registered with the server network node 42 independently of any communicant identifier. The server network node 42 determines the source and sink capabilities of the virtual presence apparatus, either directly (e.g., from the configuration data) or indirectly (e.g., by using the device type identifier for the virtual presence apparatus 12 as an index into a device capabilities table).

In some examples, the virtual presence apparatus 12 is associated with a virtual area independently of any particular communicant such that it is available as a resource for any communicant who is present in the virtual area. In this way, the virtual presence apparatus functions as a prop or a fixture of the associated virtual area, which is tied to the physical location of the virtual presence apparatus. In some examples, the association between the virtual presence apparatus and the virtual area is such that the virtual area is inaccessible until after the virtual presence apparatus has been logged into the network infrastructure service environment 44. In some of these examples, communicants cannot establish a presence in the associated virtual area (and, in some cases, may not even be presented with an option for entering the virtual area such that the virtual area does not appear to exist) until after the virtual presence apparatus has been connected to the virtual area by the network infrastructure service environment 44. These examples allow communicants to establish a persistent association between a virtual area and a particular physical space by leaving the virtual presence apparatus in the same physical space, thereby leveraging the persistent spatial association with the real-world location of the physical space to further strengthen the bridging between the virtual area and the physical space.

After the virtual presence apparatus 12 has been registered with the server network node 42, the virtual presence apparatus 12 can be logged into the network infrastructure service environment 44. The virtual presence apparatus 12 can either log itself into the network infrastructure service environment 44 automatically each time it is turned on or it can be logged into the network infrastructure service environment 44 by a host computer. If the associated virtual area already has been instantiated, the server network node 42 sends provisioning instructions for establishing respective sessions between the virtual presence apparatus 12 and the client network nodes of the communicants who are present in the virtual area and for updating the appearance of the virtual area to include a graphical representation of the virtual presence apparatus 12 in the graphical interfaces displayed on the client network nodes. If the associated virtual area has not yet been instantiated, the server network node 42 instantiates the associated virtual area so that communicants operating respective client network nodes can access the virtual area.

The provisioning instructions sent by the server network node 42 are used to establish communication sessions between the client network nodes and the virtual presence apparatus. In some examples, data is shared between the client network nodes and the virtual presence apparatus 12 as definition records over transport protocol sockets. The client network nodes and the virtual presence apparatus 12 receive content from each other through definition records that are received on content-specific channels on respective peer-to-peer sessions. Data is shared in accordance with a publish/subscribe model. A stream transport service on each of the client network nodes and the virtual presence apparatus 12 subscribes only to the data that are needed. To subscribe, the stream transport service negotiates a channel on a session that is established with another network node. The channel is negotiated by well-known GUID for the particular area application 48. Definition records are transmitted only when a subscriber exists on the other end of a transport protocol socket. Definition records that are received by the stream transport service are delivered to the subscribing ones of the local communication processes on arrival. Example of the structure and operation of the stream transport service and the data sharing communication sessions are described in U.S. patent application Ser. No. 12/825,512, filed Jun. 29, 2010.

In some examples, the virtual presence apparatus 12 transmits the output data corresponding to the human perceptible stimulus in the physical space to the client network nodes in connection with the virtual area. In this process, the virtual presence apparatus 12 typically processes the output data and configures its communication interface to incorporate the output data into the output signal that is sent to a client network node. In some examples, the output signal includes at least one of the globally unique identifier of the virtual presence apparatus, an identifier of the virtual area, and optionally an identifier of a zone of the virtual area. The output signal typically is free of any communicant identifier (i.e., an identifier that identifies a particular communicant). In these examples, the virtual area (or the specified zone of the virtual area) serves as a termination point for one or more data streams that represent physical stimuli in a physical space occupied by the virtual presence apparatus 12, where the data streams are published by the virtual presence apparatus in the virtual area/zone, communicants who are present in the virtual area/zone respectively are able to subscribe to one or more of the data streams, and the server network node 42 provisions data stream connections for the data streams that are subscribed to by respective ones of the communicants who are present in the virtual area/zone.

The virtual presence apparatus 12 typically determines the input data from the input signal that is received through its communication interface from a respective client network node that is connected to the virtual area. The input signal typically includes at least one of a globally unique identifier of the respective client network node and an identifier of the virtual area. The virtual presence apparatus 12 typically derives input data from the input signal and passes the input data to an output transducer, which generates human perceptible stimulus in the physical space.

Figure 6:
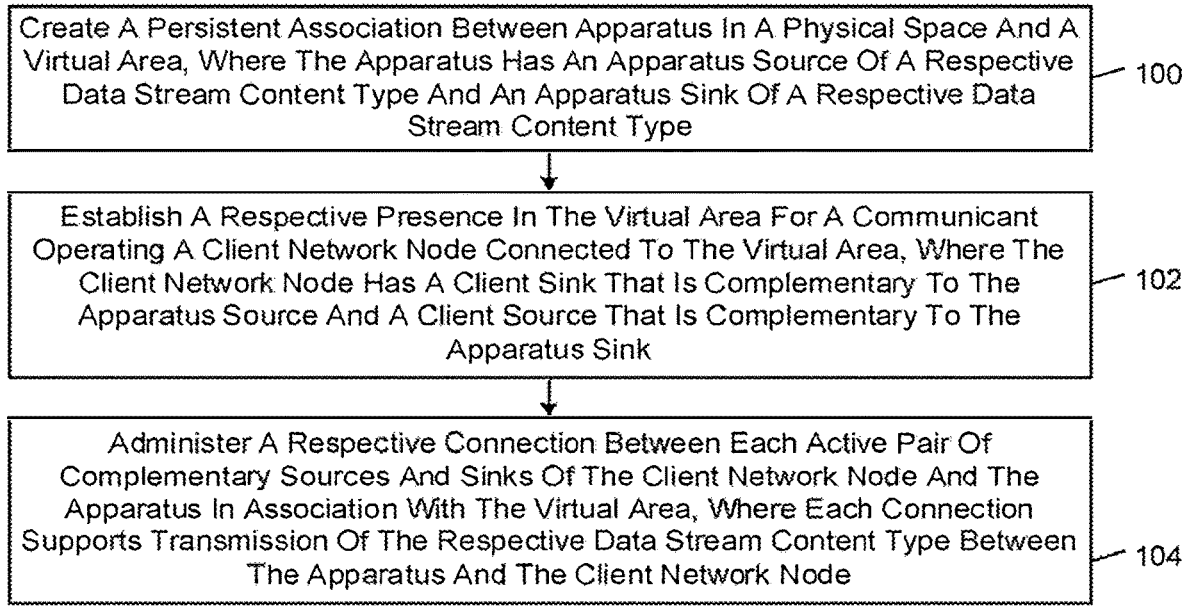
FIG. 6 is a flow diagram of an example of a method of administering communications between a virtual area and a physical space.

FIG. 6 shows an example of a method that is implemented by an example of the server network node 42 for administering communications between a virtual area and a physical space. In accordance with this method, the server network node 42 creates a persistent association between virtual presence apparatus in a physical space and a virtual area (FIG. 6, block 100). The apparatus has an apparatus source of a respective data stream content type and an apparatus sink of a respective data stream content type. The server network node 42 establishes a respective presence in the virtual area for a communicant operating a client network node connected to the virtual area (FIG. 6, block 102). The client network node has a client sink that is complementary to the apparatus source and a client source that is complementary to the apparatus sink. The server network node 42 administers a respective connection between each active pair of complementary sources and sinks of the client network node and the apparatus in association with the virtual area, where each connection supports transmission of the respective data stream content type between the apparatus and the client network node (FIG. 6, block 104).

In some examples of the method of FIG. 6, the association between the virtual presence apparatus 12 and the virtual area is independent of any particular communicant. The server network node 42 typically receives a globally unique identifier of the virtual presence apparatus 12, and associates the identifier with the virtual area. In some examples, the virtual area includes multiple zones each of which supports establishment of a respective presence for one or more communicants and defines a respective persistent context for realtime communications between the client network nodes of communicants who are present in the zone. In some of these examples, the server network node 42 creates a persistent association between the physical presence apparatus and a respective one of the zones of the virtual area.

The server network node 42 establishes a respective presence in the zone for the virtual presence apparatus. In some examples, the server network node 42 establishes the presence for the virtual presence apparatus in response to receipt of a login request identifying the virtual presence apparatus. The virtual presence apparatus or a network node (e.g., a central hub or a client network node) that is hosting the virtual presence apparatus may generate the login request for the virtual presence apparatus. In some examples, the server network node 42 establishes a presence for both the virtual presence apparatus and a communicant in response to respective login requests that are sent by the same client network node. In some examples, in response to receipt of a login request that includes the identifier of the virtual presence apparatus, the server network node 42 initiates the virtual area to enable the virtual area to be communicant accessible.

The server network node 42 typically associates the virtual presence apparatus 12 with an object in the virtual area. The server network node 42 typically creates an object that represents the virtual presence apparatus 12 in the virtual area. The object typically is associated with an interface for interacting with the virtual presence apparatus 12. In some examples, the server network node 42 associates the object with a graphical representation of the virtual presence apparatus 12. In some examples, the graphical representation of the virtual presence apparatus 12 includes a brand that is associated with the virtual presence apparatus. The brand may include a name, term, design, symbol, or any other feature that identifies a source (e.g., manufacturer or seller) of the virtual presence apparatus. The server network node 42 transmits to each of the communicants who are present in the zone a respective specification of a visualization of graphical representations of the object and the avatars in the virtual area. The client network nodes use the specifications to display respective graphical representations of the virtual presence apparatus 12 and the communicants in spatial relation to a graphical representation of the virtual area.

In some examples, the object representing the virtual presence apparatus is associated with a particular communicant and the visualization of the virtual area shows an association between a graphical representation of the object and the particular communicant. In some of these examples, the visualization of the virtual area shows the graphical representation of the object associated with a graphical representation of the avatar representing the particular communicant. For example, the virtual presence apparatus may be personal gear (e.g., a human interface device, such as a headset, or other personal device) that is carried or worn by the particular communicant, and the visualization may show a graphical representation of the gear as a decoration or embellishment on the graphical representation of the particular communicant's avatar (e.g., showing a graphical representation of a headset on the communicant's avatar). In some examples, the visualization of the virtual area shows the graphical representation of the object representing the virtual presence apparatus associated with a location in the virtual area that is assigned to the particular communicant. For example, the virtual presence apparatus may be personal gear (e.g., a personal printer, scanner, telephony device, or a memory resource of a personal computer) that is assigned or belongs to the particular communicant, and the visualization may show a graphical representation of the in a room (e.g., an office or personal room) of the virtual area that is assigned to the particular communicant. In some of these examples, the server network node 42 may determine the style used to represent the personal gear in the visualization based on configuration information received from the particular communicant (e.g., an indication that the graphical representation of the gear should be associated with the communicant's avatar or the communicant's designated default zone, such as the communicant's home zone or office) or automatically based on a predefined mapping between personal gear category types and presentation styles (e.g., headsets are represented as graphical decorations on the respective communicants' avatars, whereas hard drive of personal computers are represented as icons in the respective communicants' designated default zones).

In some examples, the server network node 42 transmits to the client network node a specification of visual cues for displaying indications of respective states of a source of the virtual presence apparatus 12. Based on a determination that that the source of the virtual presence apparatus is in an active state, the server network node 42 transmits to the client network node a specification of a first visual cue, and based on a determination that the source of the virtual presence apparatus is in an inactive state, the server network node 42 transmits to the client network node a specification of a second visual cue that is different from the first visual cue. In some examples, the specifications of the first and second visual cues are provided in respective definition records.

The server network node 42 administers realtime communications between the respective network nodes of the communicants who are present in the zone and provisions at least one data stream connection between the virtual presence apparatus 12 and one or more of the network nodes of the communicants who are present in the zone. In some examples, the server network node 42 administers respective connections between each active pair of complementary sources and sinks of the client network node and the apparatus. These connections bridge communicant activity in the physical space into the virtual area and bridge communicant activity in the virtual area into the physical space. In some of these examples, the server network node 42 administers connections that relay data corresponding to communicant activity in the physical space from the source of the virtual presence apparatus 12 to the client network node. In some of these examples, the server network node 42 administers connections that relay data corresponding to communicant activity in the virtual area from the client network node to the sink of the virtual presence apparatus 12. In some examples, the virtual presence apparatus 12 publishes data streams of different data stream types, and the server network node 42 provisions the client network nodes to receive data streams of different data stream types that are published by the particular physical apparatus. In some examples, the server network node 42 provisions a data stream connection between a client network node and the virtual presence apparatus in response to a request from the client network node to subscribe to data published by the particular physical apparatus. In some examples, the server network node 42 provisions a data stream connection between a client network node of a particular communicant and the virtual presence apparatus automatically upon entry of the particular communicant into the zone.

In some examples, the source of the virtual presence apparatus 12 corresponds to a transducer that transforms human perceptible stimulus that is broadcasted in the physical space into output data of the respective data stream content type. In some examples, the source of the virtual presence apparatus 12 corresponds to a transducer that transforms input data of the respective data stream content type into human perceptible stimulus that is broadcasted into the physical space. In some examples, the source of the virtual presence apparatus 12 includes a microphone and the sink of the virtual presence apparatus 12 includes a speaker. The microphone generates output voice data from human voice sound projected into the physical space. The speaker projects human voice sound into the physical space based on input voice data associated with the virtual area. In some of these examples, the server network node 42 administers connections that relay the output voice data from the apparatus to the client network node and that relay the input voice data from the client network node to the apparatus. In some examples, the source of the virtual presence apparatus 12 includes a camera that captures images of a scene in the physical space 14 and generates output image data from the captured images. In some of these examples, the server network node 42 administers a connection that relays the output image data from the virtual presence apparatus 12 to the client network node. In some examples, the sink of the virtual presence apparatus 12 includes a projector that projects images into the physical space. In some of these examples, the server network node 42 administers a connection that relays input control data for controlling the projecting from the client network node to the virtual presence apparatus 12. In some examples, the sink of the virtual presence apparatus 12 includes a laser pointer that projects a laser beam into the physical space. In some of these examples, the server network node 42 administers a connection that relays input control data for controlling the projecting of the laser beam from the client network node to the virtual presence apparatus 12.

Thus, in some examples, based on communicant input in connection with the object representing the virtual presence apparatus 12, the server network node 42 administers a connection between an audio source of the client network node and an audio sink of the virtual presence apparatus 12. In some examples, based on communicant input in connection with the object, the server network node 42 administers a connection between an application sharing source of the client network node and an image projection sink of the virtual presence apparatus 12. In some examples, based on communicant input in connection with the object, the server network node 42 administers a connection between a laser pointer control source of the client network node and a laser pointer control sink of the apparatus.

In some examples, the virtual presence apparatus 12 is located in a particular physical space, and the server network node 42 locates the object representing the virtual presence apparatus 12 in a particular one of the zones of the virtual area according to a mapping between the particular physical space and the particular zone. In some of these examples, the mapping associates an identifier of the physical space with an identifier of the particular zone, creating a persistent association between the particular physical space and the particular zone of the virtual area. In some of these examples, the mapping additionally associates an identifier of the physical apparatus 12 with the identifier of the physical space. In some examples, the visualization of the virtual area shows the particular zone with a label that connotes a name associated with the physical space.

In some examples, the server network node 42 establishes a respective presence in the virtual area for a particular communicant based on a determination that the particular communicant is in the physical space 14. In some examples, the server network node 42 receives location data (e.g., Global Positioning System (GPS) data) that is associated with the particular communicant (e.g., by a GPS device), and determines that the particular communicant is in the physical space based on comparison of the received location data with location data associated with the physical space. In some examples, the server network node 42 receives audio data from the source of virtual presence apparatus 12, and associates the audio data with a communicant in the physical space based on comparison of the audio data with one or more voice data records associated with respective communicants. The voice records typically correspond to voiceprints (also referred to as voice templates or voice models) that are created from features that are extracted from the recorded speech of known communicants in accordance with a speaker recognition enrollment process. Each voiceprint is associated with the identity of a particular communicant. The server network node 42 typically associates the audio data with the communicant in response to a determination that features extracted from the audio data correspond to the voiceprint previously associated with the communicant. In this way, the server network node 42 can automatically identify communicants who are in the physical space without requiring them to log into the network infrastructure service environment 44 through respective client network nodes. Once a particular communicant in the physical space 14 has been identified, the server network node 42 can automatically establish a presence for that communicant in the virtual area associated with the virtual presence apparatus 12 and track utterances from that communicant in the audio data captured by the virtual presence apparatus such that visual cues indicative of the state of that communicant's voice (e.g., speaking or silent) can be presented in the spatial visualization of the virtual area that is displayed to the remote communicant on the remote client network node 16.

Figure 7:
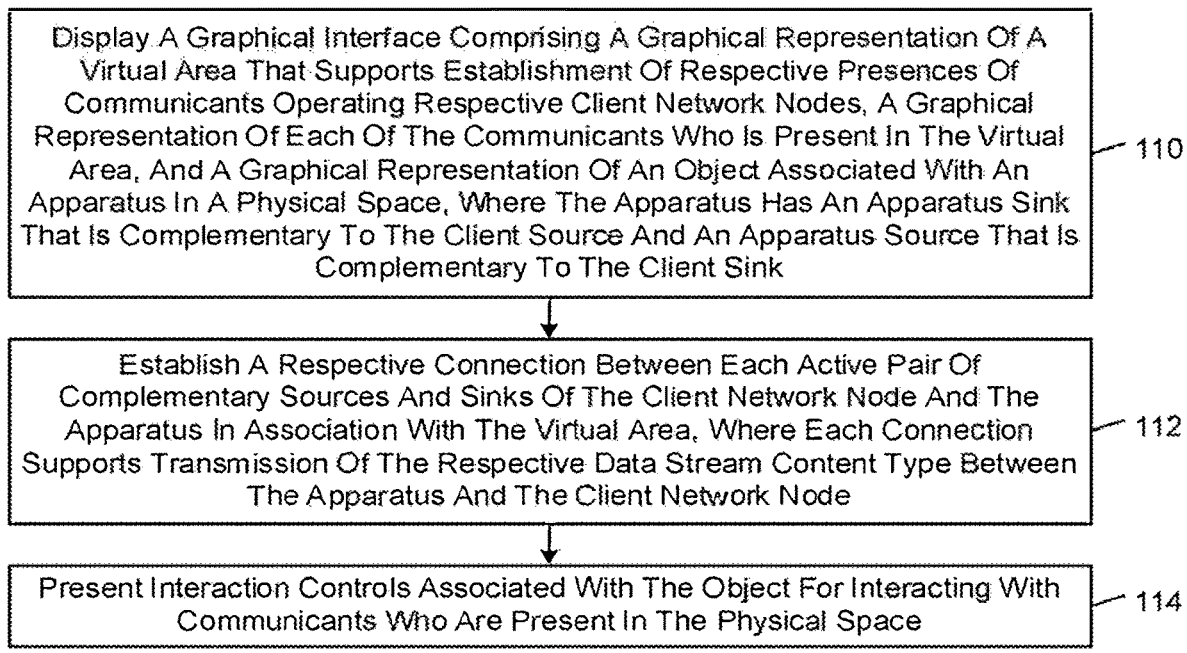
FIG. 7 is a flow diagram of an example of a method of communicating between a virtual area and a physical space.

FIG. 7 shows an example of a method that is performed by an example of the communications application 20 for communicating between a virtual area and a physical space. In accordance with this method, the communications application 20 displays a graphical interface that includes a graphical representation of the virtual area that supports establishment of respective presences of communicants operating respective client network nodes, a graphical representation of each of the communicants who is present in the virtual area, and a graphical representation of an object associated with an apparatus (e.g., the virtual presence apparatus 12) in the physical space (FIG. 7, block 110). The apparatus has an apparatus sink that is complementary to the client source and an apparatus source that is complementary to the client sink. The communications application 20 establishes a respective connection between each active pair of complementary sources and sinks of the client network node and the apparatus in association with the virtual area, where each connection supports transmission of the respective data stream content type between the apparatus and the client network node (FIG. 7, block 112). The communications application 20 presents interaction controls associated with the object for interacting with communicants who are present in the physical space (FIG. 7, block 114).

In some examples of the method of FIG. 7, the graphical representation of the virtual area corresponds to a virtualized representation of the physical space. In some of these examples, the virtualized representation connotes the real-world physical space. For example, the virtualized representation may have a virtual presentation that resembles one or more distinctive visual features of the real-world physical space or the virtualized representation may include a descriptive name or other label that is associated with the real-world physical space.

In some examples, the communications application 20 receives from a network service administering the virtual area a specification for displaying the graphical representation of the object in spatial relation to the graphical representation of the virtual area.

In some examples, the communications application 20 shows in the graphical interface indications of respective states of the apparatus source of the virtual presence apparatus 12 in connection with the graphical representation of the object. In some of these examples, the process of showing the state indications involves displaying a first visual cue when the virtual presence apparatus source is in an active state, and displaying a second visual cue that is different from the first visual cue when the virtual presence apparatus source is in an inactive state.

In some examples, based on communicant input in connection with the object, the communications application 20 establishes a connection between an audio source of the client network node and an audio sink of the virtual presence apparatus 12.

In some examples, based on communicant input in connection with the object, the communications application 20 establishes a connection between an application sharing source of the client network node and an image projection sink of the virtual presence apparatus 12.

In some examples, based on communicant input in connection with the object, the communications application 20 establishes a connection between a laser pointer control source of the client network node and a laser pointer control sink of the virtual presence apparatus 12.

In some examples, the source of the virtual presence apparatus 12 includes a microphone and the sink of the virtual presence apparatus 12 includes a speaker. The microphone generates output voice data from human voice sound projected into the physical space, the speaker projects human voice sound into the physical space from input voice data associated with the virtual area, and the communications application 20 establishes connections that relay the output voice data from the virtual presence apparatus 12 to the client network node and that relay the input voice data from the client network node to the virtual presence apparatus 12.

In some examples, the source of the virtual presence apparatus 12 includes a camera that captures images of a scene in the physical space and generates output image data from the captured images, and the communications application 20 establishes a connection that relays the output image data from the virtual presence apparatus 12 to the client network node.

In some examples, the sink of the virtual presence apparatus 12 includes a projector that projects images into the physical space, and the communications application 20 establishes a connection that relays input control data for controlling the projecting from the client network node to the virtual presence apparatus 12.

In some examples, the sink of the virtual presence apparatus 12 includes a laser pointer that projects a laser beam into the physical space, and the communications application 20 establishes a connection that relays input control data for controlling the projecting of the laser beam from the client network node to the virtual presence apparatus 12.

Figure 8:
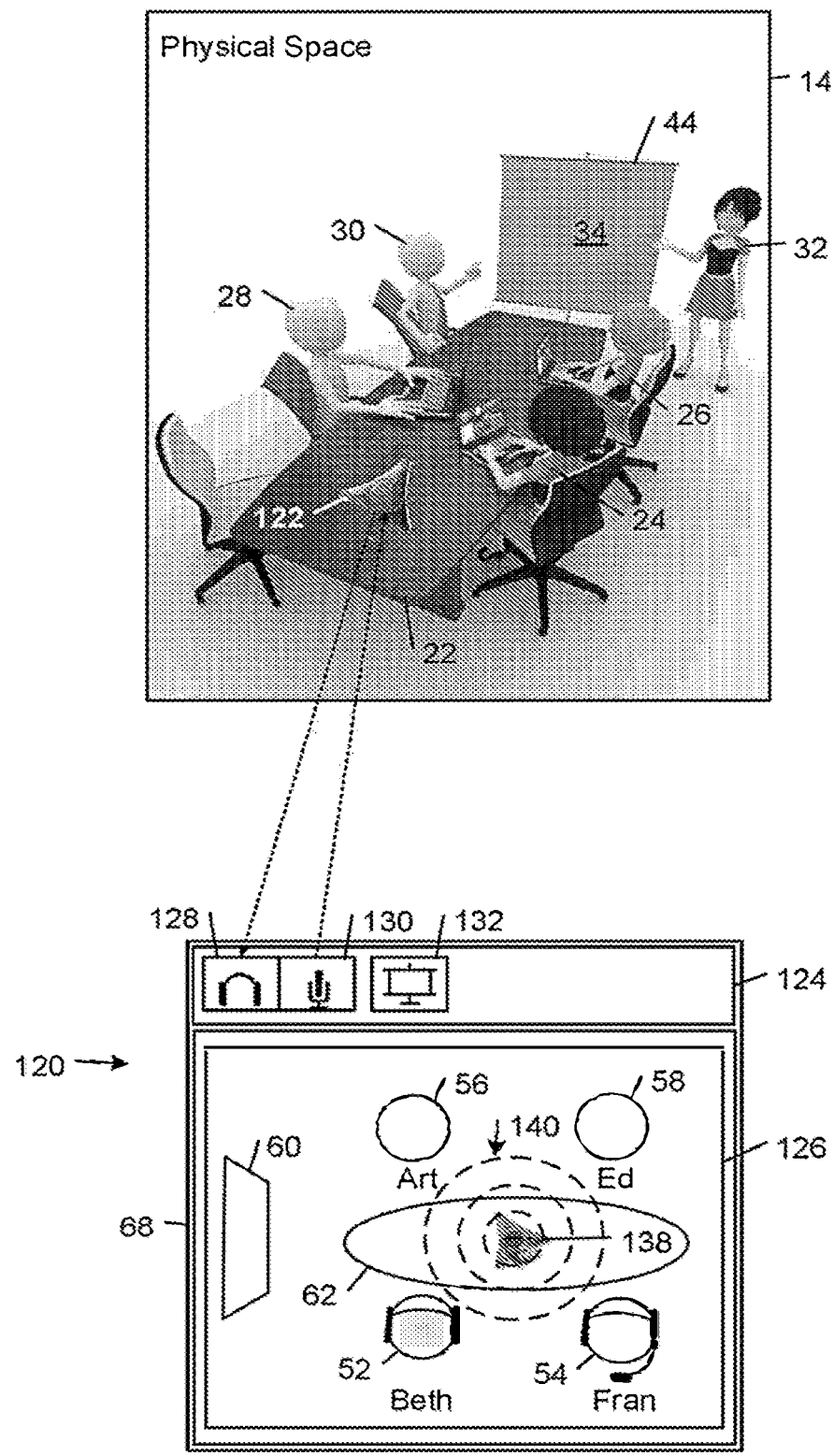
FIG. 8 is a diagrammatic view of an example of a graphical interface for interfacing a user with an example of virtual presence apparatus in a physical space.

FIG. 8 shows an example of a graphical interface 120 that is generated by the communications application 20 on a client network node (e.g., client node 16) for interfacing a user with an example 122 of the virtual presence apparatus 12 in the physical space 14.

The graphical interface 120 includes a toolbar 124 and a viewer panel 126. The toolbar 124 includes a headphone control 128 for toggling on and off the local speakers of the client network node, a microphone control 130 for toggling on and off the local microphone of the client network node, and a view screen button 132 for setting the viewer panel 126 to content being shared in connection with the view screen object 60. The user also may select the view screen object 60 to initiate an application sharing session in the virtual area 46. The viewer panel 126 typically shows communicant selectable content being rendered by the client network node. Examples of such content include a spatial visualization of the virtual area 46 (currently shown) and application content (e.g., web service content rendered by a web browser application such as Microsoft® Internet Explorer®, or document content being rendered by a document processing application such as Microsoft® Word® or Power Point® software applications).

In the example shown in FIG. 8, the virtual presence apparatus 122 is a virtual area enabled speakerphone, which is represented by a speakerphone object 138 in the spatial visualization of the virtual area 46 that is shown in the viewer panel 126. The virtual presence apparatus 122 includes a microphone that generates output voice data from human voice sounds projected into the physical space 14 and a speaker that projects human voice sounds into the physical space 14 based on input voice data associated with the virtual area. The "on" or "off" state of the speakerphone microphone is depicted in the spatial visualization of the virtual area by the presence or absence of a series of concentric circles 140 that dynamically radiate away from the speakerphone object 138 in a series of expanding waves. When the microphone is on, the radiating concentric circles 140 are present and, when the microphone is off, the radiating concentric circles 140 are absent. In addition to or alternatively, the current activity state of the speakerphone microphone channel is indicated by a dynamic visualization that lightens and darkens the speakerphone object 138 in realtime to reflect the presence or absence of audio data on the speakerphone microphone channel. Thus, the user can determine when a communicant in the physical space 14 is speaking by the "blinking" of the coloration of the speakerphone object 138.

Figure 9:
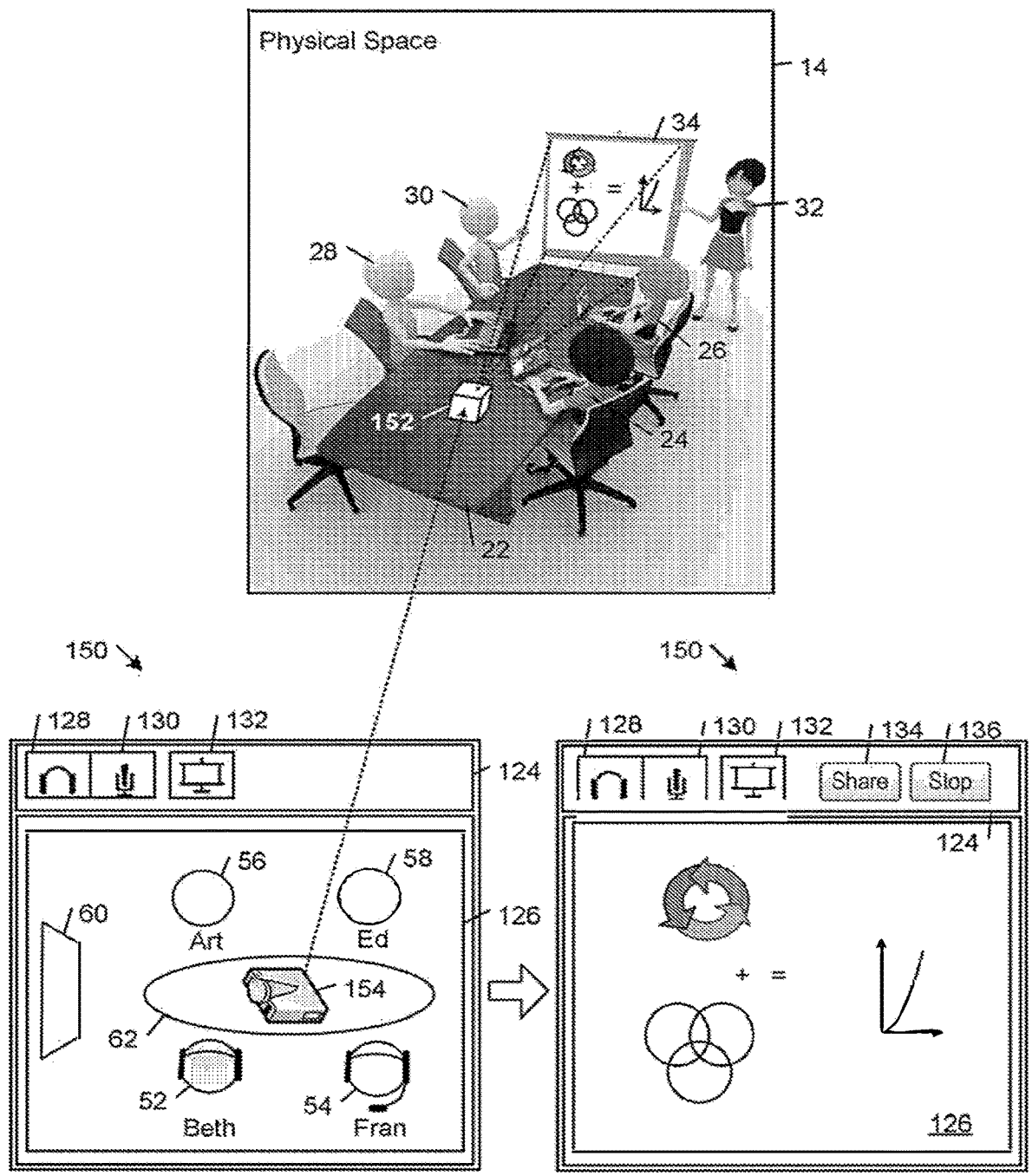
FIG. 9 is a diagrammatic view of an example of a physical space and an example of a graphical interface for interfacing a user with an example of virtual presence apparatus in the physical space.

FIG. 9 shows an example of a graphical interface 150 that is generated by the communications application 20 on a client network node (e.g., client node 16) for interfacing a user with an example 152 of the virtual presence apparatus 12 in the physical space 14.

The graphical interface 150 includes the toolbar 124 and the viewer panel 126 of the graphical interface 120 shown in FIG. 8. The toolbar 124 includes the headphone control 128 for toggling on and off the local speakers of the client network node, the microphone control 130 for toggling on and off the local microphone of the client network node, and a view screen button 132 for setting the viewer panel 126 to content being shared in connection with the view screen object 60. The user may select the view screen object 60 to initiate an application sharing session in the virtual area 46. The viewer panel 126 typically shows communicant selectable content that is rendered by the client network node.

In the example shown in FIG. 9, the virtual presence apparatus 152 is a virtual area enabled device that integrates speakerphone and digital projector functionalities. The virtual presence apparatus 152 includes a microphone that generates output voice data from human voice sounds projected into the physical space 14, a speaker that projects human voice sounds into the physical space 14 based on input voice data associated with the virtual area, and a projector that projects light into the physical space 14 responsive to input data transmitted by the client network node in connection with the virtual area 46.

The virtual presence apparatus 152 is represented by a projector object 154 in the spatial visualization of the virtual area 46 that is shown in the viewer panel 126. In this example, when the user selects the projector object 154, the communications application 20 modifies the graphical interface 150 to include a Share button 134 and a Stop button 136 in the tool bar 124, and sets the viewer panel 126 to display the contents of an application being shared. The user initiates an application sharing session in the physical space 14 by selecting the Share button 134. In response to the selection of the share button 134, the communications application 20 provides an interface that enables the user to select an application to share (e.g., Microsoft® PowerPoint®), sets the viewer panel 126 to display the contents being rendered by the selected application, and streams screen share data to the virtual presence apparatus 152, which projects the screen share data onto the real-world view screen 34 in the physical space 14. Examples of systems and methods of generating and streaming screen share data are described in U.S. patent application Ser. No. 12/418,270, filed Apr. 3, 2009. The user can terminate the application sharing session in the physical space 14 by selecting the Stop button 136.

Figure 10:
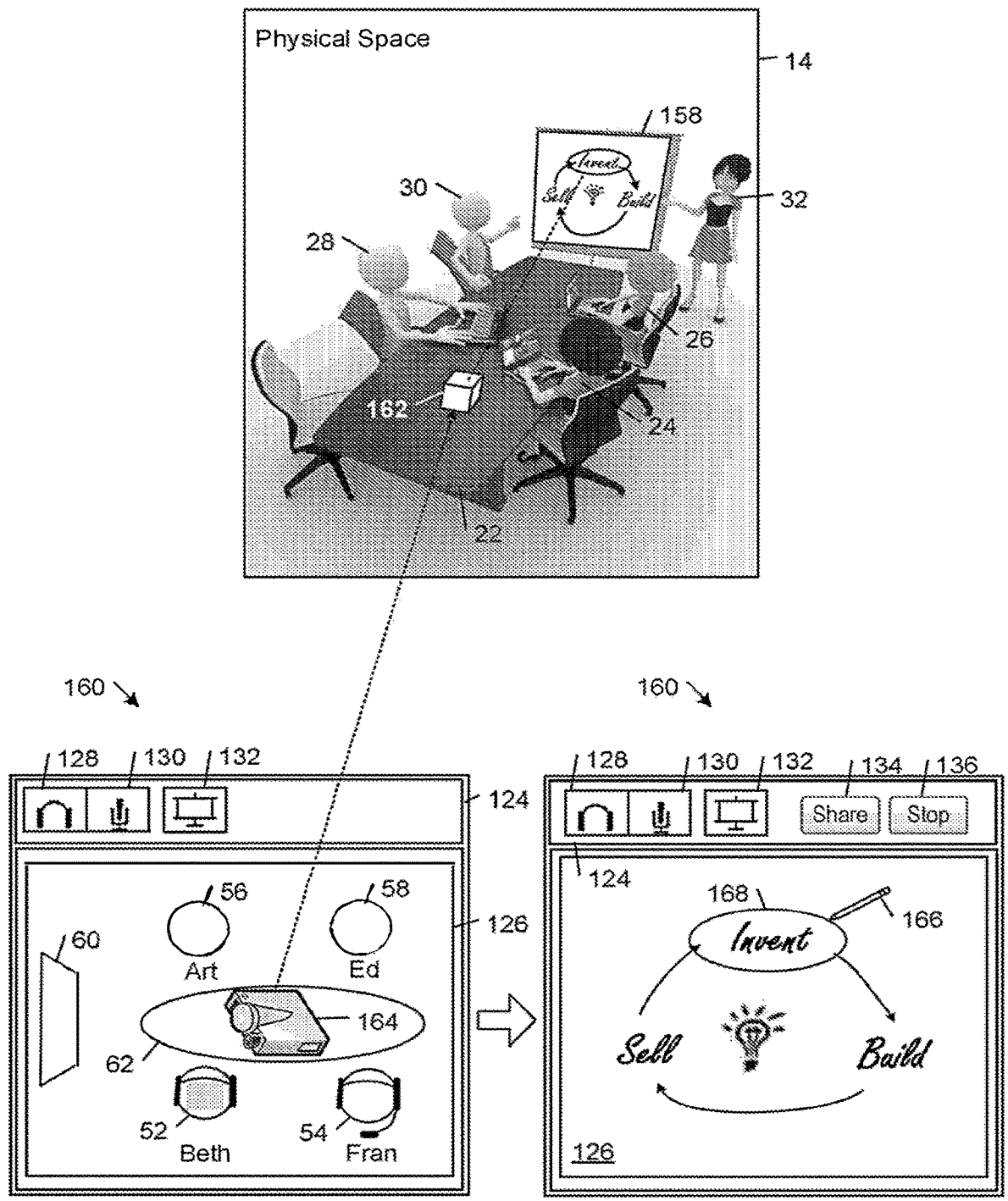
FIG. 10 is a diagrammatic view of an example of a physical space and an example of a graphical interface for interfacing a user with an example of virtual presence apparatus in the physical space.

FIG. 10 shows an example of a graphical interface 160 that is generated by the communications application 20 on a client network node (e.g., client node 16) for interfacing a user with an example 162 of the virtual presence apparatus 12 in the physical space 14. In this example, the communicant 34 is giving a presentation on a white board 158 in the physical space 14.

The graphical interface 160 includes the toolbar 124 and the viewer panel 126 of the graphical interface 120 shown in FIG. 8. The toolbar 124 includes the headphone control 128 for toggling on and off the local speakers of the client network node, the microphone control 130 for toggling on and off the local microphone of the client network node, and a view screen button 132 for setting the viewer panel 126 to content being shared in connection with the view screen object 60. The user may select the view screen object 60 to initiate an application sharing session in the virtual area 46. The viewer panel 126 typically shows communicant selectable content being rendered by the client network node.

In the example shown in FIG. 10, the virtual presence apparatus 162 is a virtual area enabled device that integrates a speakerphone, a digital projector, and a camera. The speakerphone includes a microphone that generates output voice data from human voice sounds projected into the physical space 14, and a speaker that projects human voice sounds into the physical space 14 based on input voice data associated with the virtual area. The projector projects light (e.g., images, shapes, lines, and spots) into the physical space 14 responsive to input data transmitted by the client network node in connection with the virtual area 46. In some examples, the projector is a digital image projector. In other examples, the projector is a remote-controlled laser pointer. The camera captures images of a scene in the physical space 14 (e.g., images of the whiteboard 158) and generates output image data from the captured images. The camera may be implemented by any type of imaging device that is capable of capturing one-dimensional or two-dimensional images of a scene. The camera typically is a digital video camera.

The virtual presence apparatus 162 is represented by a projector-camera object 164 in the spatial visualization of the virtual area 46 that is shown in the viewer panel 126. In this example, when the user selects the projector-camera object 164, the communications application 20 modifies the graphical interface 150 to include a Share button 134 and a Stop button 136 in the tool bar 124, and sets the viewer panel 126 to display the images captured by the virtual presence apparatus 162 in the physical space 14. The user initiates a sharing session in the physical space 14 by selecting the Share button 134. In response to the selection of the Share button 134, the communications application 20 sets the viewer panel 126 to display the images captured by the virtual presence apparatus 162, provides an interface that enables the user to provide inputs in relation to the images displayed in the viewer panel (e.g., superimpose graphical content, such as predesigned or hand drawn images or comments, onto the images), and streams data describing the inputs to the virtual presence apparatus 162, which projects the streamed data onto the whiteboard 158 in the physical space 14. The user can terminate the sharing session in the physical space 14 by selecting the Stop button 136.

In the illustrated example, the communications application 20 provides drawings tools (e.g., the pencil tool 166) that allow the user to superimpose lines, shapes (e.g., the ellipse 168), and other graphical content onto the image of the view screen 34 captured by the camera component of the virtual presence apparatus 162.

In examples in which the projector component of the virtual presence apparatus 162 is a digital projector, the communications application 20 may stream data describing the user inputs to the virtual presence apparatus 162. In examples in which the projector is a remote-controlled laser pointer, the communications application 20 may convert the user inputs into control data for controlling the movement of the remote-controlled laser pointer in the physical space 14. In this way, the user can interact with the communicants in the physical space 14 in a substantive way. For example, the user can provide comments or other visual indications that highlight or direct a viewer's attention to specific parts of the presentation being given by the communicant 32 in connection with the white board 158. In some examples, the graphical interface 160 includes additional controls for streaming application sharing data from the client network node to the virtual presence apparatus 162 for projection onto the whiteboard 158 or other surface in the virtual space 14, as described above in connection with the example shown in FIG. 9.

Figure 11:
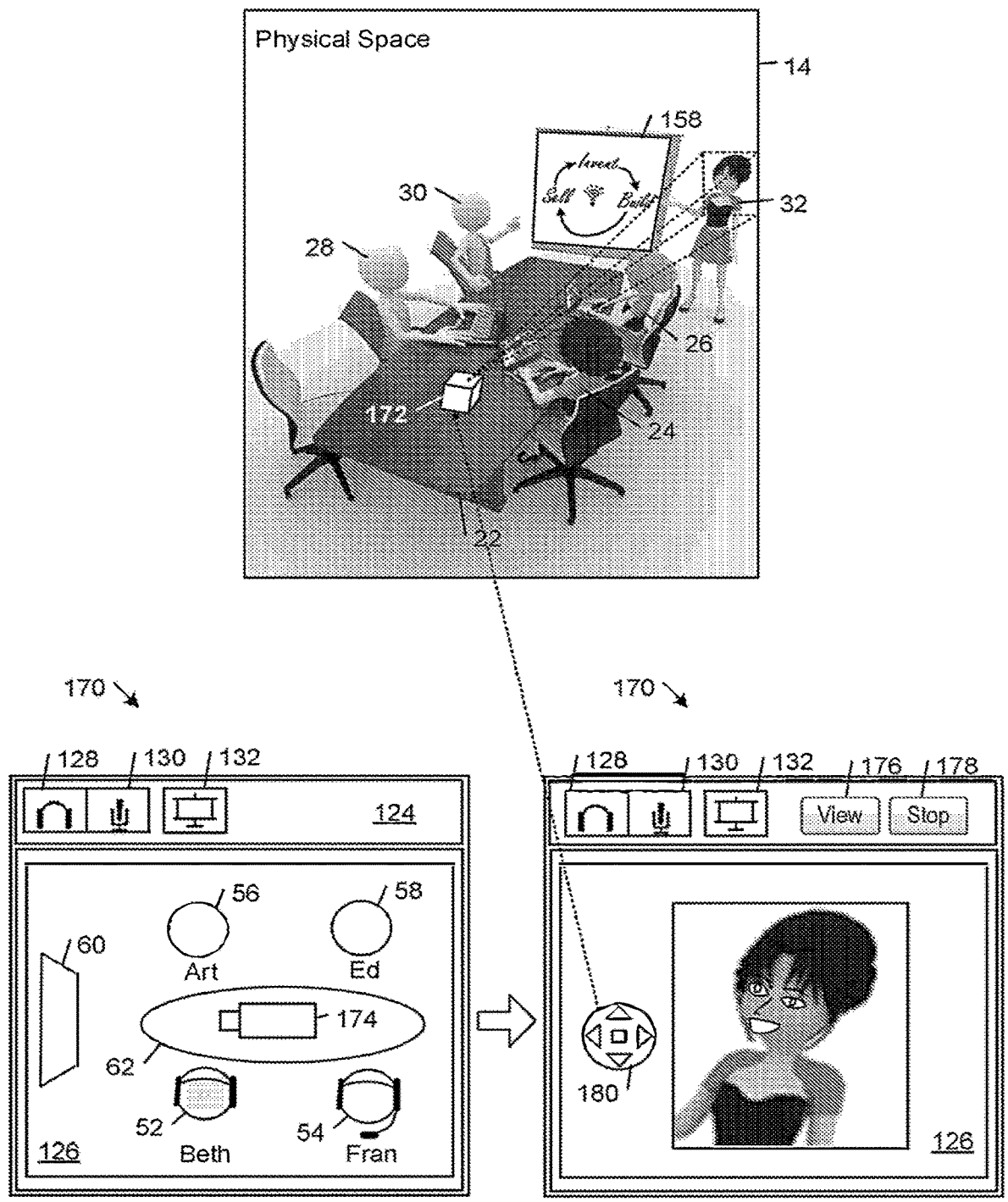
FIG. 11 is a diagrammatic view of an example of a physical space and an example of a graphical interface for interfacing a user with an example of virtual presence apparatus in the physical space.

FIG. 11 shows an example of a graphical interface 170 that is generated by the communications application 20 on a client network node for interfacing a user with an example 172 of the virtual presence apparatus 12 in the physical space 14. In this example, the communicant 34 is giving a presentation on a white board 158 in the physical space 14.

The graphical interface 170 includes the toolbar 124 and the viewer panel 126 of the graphical interface 120 shown in FIG. 8. The toolbar 124 includes the headphone control 128 for toggling on and off the local speakers of the client network node, the microphone control 130 for toggling on and off the local microphone of the client network node, and a view screen button 132 for setting the viewer panel 126 to content being shared in connection with the view screen object 60. The user may select the view screen object 60 to initiate an application sharing session in the virtual area 46.

The viewer panel 126 typically shows communicant selectable content being rendered by the client network node.

In the example shown in FIG. 11, the virtual presence apparatus 162 is a virtual area enabled device that integrates a speakerphone and a camera. The speakerphone includes a microphone that generates output voice data from human voice sounds projected into the physical space 14, and a speaker that projects human voice sounds into the physical space 14 based on input voice data associated with the virtual area. The camera captures images of a scene in the physical space 14 and generates output image data from the captured images. The camera may be implemented by any type of imaging device that is capable of capturing one-dimensional or two-dimensional images of a scene. The camera typically is a digital video camera.

The virtual presence apparatus 172 is represented by a camera object 174 in the spatial visualization of the virtual area 46 that is shown in the viewer panel 126. In this example, when the user selects the camera object 174, the communications application 20 modifies the graphical interface 150 to include a View button 176 and a Stop button 178 in the tool bar 124, and sets the viewer panel 126 to display the images captured by the virtual presence apparatus 162 in the physical space 14. The user initiates a viewing session in the physical space 14 by selecting the View button 176. In response to the selection of the View button 176, the communications application 20 sets the viewer panel 126 to display the images captured by the virtual presence apparatus 172, provides an interface 180 that enables the user to control the view of the physical space that is captured by the camera component of the virtual presence apparatus, and streams data describing the control inputs to the virtual presence apparatus 172, which moves the camera based on the streamed data. In the illustrated example, the communications application 20 provides a navigation control tool 180 that allows the user to control the pan and tilt of the camera component of the virtual presence apparatus 172. In this way, the remote communicant can interact with the physical space 14 in a substantive way (e.g., see different views of the persons and activities in the physical space 14). The user can terminate the sharing session in the physical space 14 by selecting the Stop button 178.

In some examples, different elements of the graphical interfaces described above in connection with the examples shown in FIGS. 8-11 are incorporated into a single graphical interface that may be used to interact with the virtual presence apparatus 164, which integrates a speakerphone, a digital projector, and a camera. In these examples, the graphical interface provides independent control over the respective functionalities of the speakerphone, the digital projector, and camera to enable application sharing, image projection of comments and other annotations, and camera viewing modes of operation.

III. CONCLUSION

Other embodiments are within the scope of the claims.

The invention claimed is:

1. A system comprising:
one or more processors; and
a memory, coupled to the one or more processors, and storing code that when executed by the one or more processors causes a computer system to perform operations comprising:
administering network connections between network nodes associated with respective communicants and a device that is in a physical space and is independent of any particular communicant;

initiating a communications session;

presenting the communications session on subscribing ones of the network nodes of communicants who are present in the virtual area, wherein the virtual area comprises a persistent, three-dimensional geometrical representation of a physical space that simulates a physical, real-world space, the physical space includes contents that are located within the physical space, and the contents include three-dimensional avatars of the communicants in positions within the physical space of the virtual area;

broadcasting the communications session from the device into the physical space for people who are present in the physical space.

2. The system of claim 1, wherein the initiating comprises initiating the communications session in a context defined by the virtual area.

3. The system of claim 2, wherein the communications session comprises an application sharing session.

4. The system of claim 3, wherein:

the presenting comprises, on each of subscribing ones of the network nodes of communicants who are present in the virtual area, displaying a respective stream of images of the application generated by a presenting one of the network nodes of the communicants who are present in the virtual area; and the broadcasting comprises by the device, on a screen in the physical space displaying a respective stream of images of the application generated by the presenting network node.

5. The system of claim 4, wherein the displaying comprises, by the device, projecting the stream of images of the application on the screen.

6. The system of claim 4, wherein when executed by the one or more processors, the code causes the computer system to perform operations further comprising:

transducing sounds in the physical space into audio data; and transmitting the audio data to subscribing ones of the network nodes of communicants who are present in the virtual area.

7. The system of claim 6, wherein when executed by the one or more processors, the code causes the computer system to perform operations further comprising transducing audio data received from the virtual area into sounds that are broadcasted into the physical space.

8. The system of claim 1, wherein the communications session comprises a video conferencing session.

9. The system of claim 1, wherein the initiating comprises initiating the communications session in the physical space.

10. The system of claim 9, wherein the communications session comprises a video conferencing session.

11. The system of claim 10, wherein:

encoding a stream of images and sounds captured in the physical space into output video data;

transmitting the output video data to each of subscribing ones of the network nodes of communicants who are present in the virtual area; and the presenting comprises presenting the video data on each of subscribing ones of the network nodes of communicants who are present in the virtual area.

* * * * *